United States Patent [19]

Lewis

[11] 4,060,587
[45] Nov. 29, 1977

[54] GASEOUS AND LIQUID REACTANT TREATMENT

[75] Inventor: Clifford J. Lewis, Lakewood, Colo.

[73] Assignee: National Lime Association, Washington, D.C.

[21] Appl. No.: 717,072

[22] Filed: Aug. 24, 1976

Related U.S. Application Data

[63] Continuation-in-part of Ser. No. 591,791, June 30, 1975, abandoned, which is a continuation of Ser. No. 529,647, Dec. 16, 1974, abandoned, and Ser. No. 303,368, Nov. 3, 1972, abandoned.

[51] Int. Cl.$^2$ .............................. B01F 9/08; B01J 1/00; B08B 9/06; C01B 17/04
[52] U.S. Cl. ............................... 423/210; 15/104.1 C; 134/6; 134/8; 261/90; 423/242; 423/659; 366/233; 366/607
[58] Field of Search ....................... 23/284, 285, 286; 423/210, 242, 659; 261/90, 92; 134/8, 6; 259/3, 81 R, 89; 15/90, 104.1 C, 104.07, 104.14; 432/118

[56] References Cited

U.S. PATENT DOCUMENTS

| | | | |
|---|---|---|---|
| 1,313,281 | 8/1919 | Fasting | 432/118 X |
| 1,857,785 | 5/1932 | Holzapfel | 259/3 |
| 1,910,873 | 5/1933 | Zahn | 432/118 X |
| 2,021,671 | 11/1935 | Skinner | 23/286 X |
| 2,869,838 | 1/1959 | Ryder | 23/285 UX |
| 3,220,804 | 11/1965 | Bachmann et al. | 23/286 |
| 3,281,134 | 10/1966 | Feiser, Jr. | 432/118 X |
| 3,333,837 | 8/1967 | Bojner | 432/118 X |
| 3,794,714 | 2/1974 | Atsukawa et al. | 423/242 |

Primary Examiner—Joseph Scovronek
Attorney, Agent, or Firm—Arthur A. March

[57] ABSTRACT

Movable means are provided interiorly of a rotating confined line on a substantially horizontal plane through which reactant fluids, such as liquids and gases, flow and react, whereby inherently to inhibit the adherence of particulate matter within the line and effect enhanced contact and intermingling of the liquid maintained in the form of a pool therein with the gas during rotation of the line.

The movable means comprise relatively solid objects which bounce and tumble within the line to contact the interior of the line. The relatively solid objects, which may be in the form of chains, wires, cables or any other solid media whether consisting of separate or joined components, also function to prevent the liquid, maintained in the pool and/or passing through the line from assuming a dry or precipitate state as it is splashed or otherwise distributed about the entire interior periphery of the line. The action of the tumbling media also provides complete contact between the gas and liquid flowing through the line, as well as portions of the liquid maintained in the pool, to achieve the appropriate chemical reaction therebetween for cleansing of the gases. The tumbling media causes the gases to flow in a tortuous path through the confined line and means are provided to maintain portions of the liquid in the pool, and preferably also, to raise and cascade axially extending portions of the liquid from the pool onto the gas and the tumbling media, whereby to provide a conjoint packed tower and spray column type rotating scrubber system.

10 Claims, 7 Drawing Figures

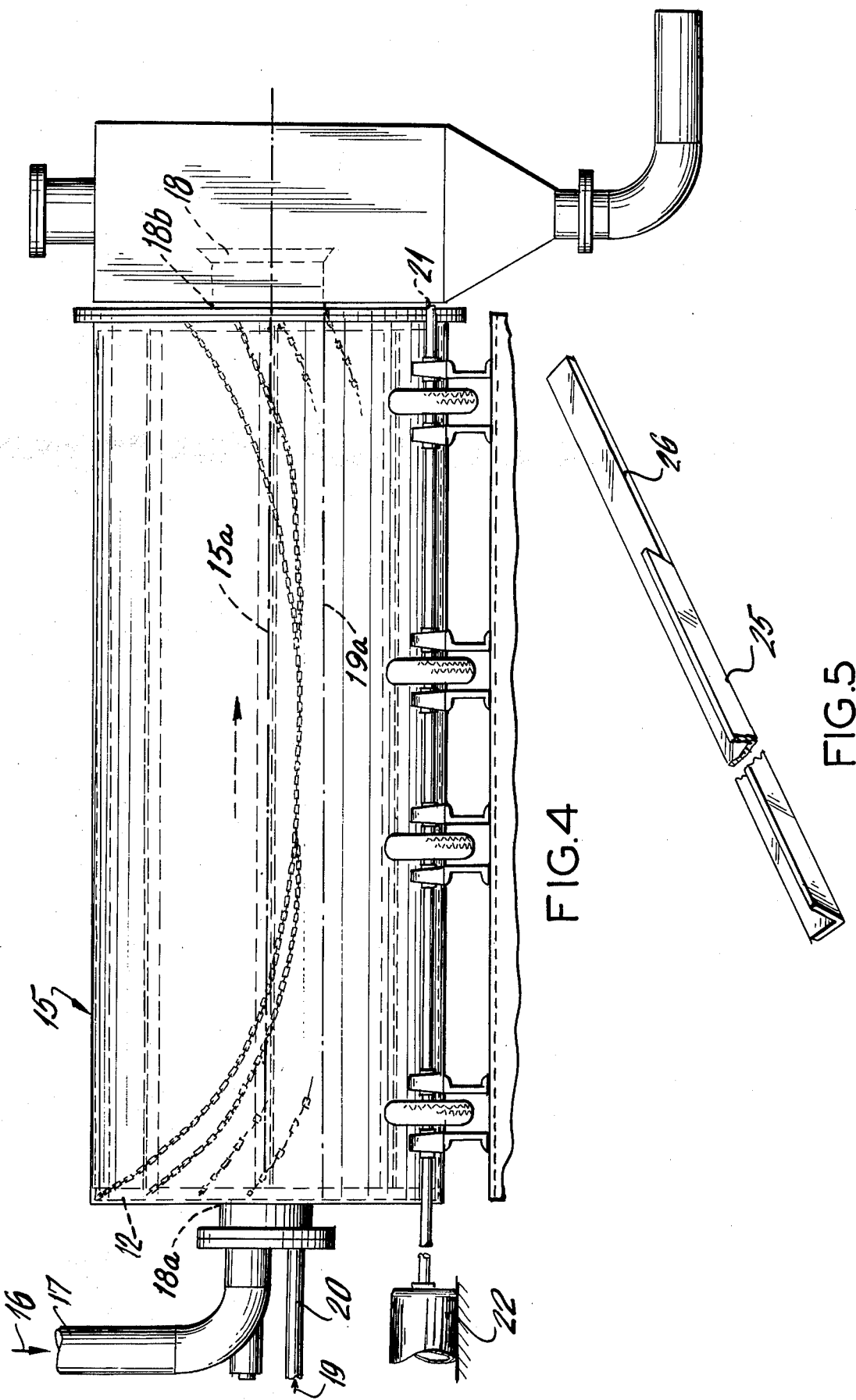

GASEOUS AND LIQUID REACTANT TREATMENT

This is a continuation in part of copending U.S. application Ser. No. 591,791, filed June 30, 1975, which is a continuation in turn of copending U.S. application Ser. No. 529,647, filed Dec. 16, 1974, and copending U.S. application Ser. No. 303,368, filed Nov. 3, 1972, the latter three of which are all now abandoned.

BACKGROUND OF INVENTION

There is a long-standing problem concerning atmospheric pollution caused by emission of sulfur dioxide from industrial plants such as power plants and metallurgical smelters.

To accomplish the air pollution abatement, virtually all of the technology involves the scrubbing of the noxious gases with an aqueous media. While water alone as a scrubbing medium will remove particulate matter and sulfur dioxide, the presence of sulfur dioxide and other acidic materials such as other sulfur oxides and nitrogen oxides in the gases to be scrubbed necessitates the addition of a neutralizing substance such as lime, or any caustic or alkaline substance, to the aqueous scrubbing medium. The use of such chemical reagents in the aqueous scrubbing medium gives rise to the formation of chemical precipitates which, possibly augmented by particulate matter already present in the gas stream and aqueous scrubbing medium, cause deposits commonly known as "scale" to adhere to the internal surface of the gas scrubbing apparatus and such deposits may accumulate until the apparatus becomes clogged to an inoperable state and must be cleaned out.

Furthermore, most heretofore proposed and used gas scrubbers are in vertical stacks and have several consequent disadvantages. For example, the flow of the aqueous cleaning media through the stack is subject to the vagaries of gravitational influence because such solutions are fed from, at, or near the top of the stack and flow to the bottom. In many instances, there is inadequate retention time for the solution and insufficient contact between the downwardly flowing solution and upwardly flowing gas whereby the desired chemical reaction is not obtained. In addition the aqueous solution may be caught in the surge of the flowing gases and blown upwardly to the emission point which requires additional and expensive equipment to contain the aqueous solution within the stack and to clean the deposits.

Very little, if any, provision has been made in known scrubbers to effect an intimate contact or intermixing between the aqueous cleaning media and the noxious gases. These fluids are instead permitted to pass in a flow countercurrent to each other and do not attain the desired chemical reactions.

BRIEF STATEMENT OF THE INVENTION

The present invention solves the foregoing problems in that means are presented which are self-cleaning and substantially inhibit any caking or formation of scale in the interior of the pipeline. Furthermore, these same means cause the gases to flow through a tortuous path and intermix the gases with the aqueous media to effect a total chemical reaction therebetween. The invention comprises means which will move within a substantially horizontal rotating confined line or tube such as a pipeline or feedline to contact virtually the entire periphery of the interior of the line as the fluids, viz. the gas and liquid media, flow through the line, especially with liquid portions maintained in the form of a pool therein. It has been found that these results can be obtained by the use of substantially solid objects placed within the line which tumble and bounce to cause a wiping effect and prevent caking or the formation of scale. As the solid objects bounce and tumble, during the rotation of the line, the liquid media is not permitted to dry but is instead maintained in a liquid phase slurry form, i.e. in such pool, and is spread around the entire interior periphery of the pipeline itself.

While chains, cables, wires or any other tumbling media or flexible linear means or flexible linear impact means may be used, hereinafter the invention will be described specifically with reference to suspended chains, cables or ropes within the interior of the line. It is to be understood, however, that the description is in no way intended to limit the scope of the invention to the particular tumblers described.

As to a specific illustrative form of the invention, a cage is provided comprising horizontally extending cross bars, preferably in the form of axially extending liquid lifters, which are secured at the ends thereof and at other points therebetween to hoops or ring-like members. The chains, which are longer than the distance between one hoop and another, are suspended between adjacent hoops and form hanging extended portions or loops. Alternatively, the chains are loosely suspended at circumferentially spaced apart points on the same hoop, preferably with successive hoops providing successive chain curtains thereby, or the chains may be successively arranged at such points without the use of such hoops. The entire cage and chain assemblage is then disposed within and attached to the interior of a substantially horizontal tubular pipeline or feedline which is located between the noxious gas-producing facility and the exit port for the gases.

The pipeline and the cage contained therein or the pipeline and the chain arrangement otherwise mounted therein without the use of such cage, are rotated by any suitable driving means. An aqueous cleansing solution which is preferably of a lime base or any other suitable alkaline means, is introduced into the pipeline and maintained in a pool therein.

As the pipeline and chains, with or without the cage, rotate, the chains tumble and bounce across substantially the entire inner periphery of the pipeline through which flows the fluids, namely, the gases and aqueous solution. This dynamic thrust and impact mechanical action provides a self-cleaning arrangement in which the pipeline is thoroughly cleansed to prevent any buildup of scale or caking not only due to the wiping action but also because the actual splashing and stirring of the aqueous solution from the pool maintains the same in a liquid or flowable phase. The bouncing and tumbling of the chains cause them to be maintained in a clean uncoated state.

In addition, as the tumbling means and the cross-bars or liquid lifters, arranged in the line with or without the use of a cage of hoops, pass through the aqueous cleaning solution, they correspondingly are thoroughly wetted and carry the aqueous solution from the pool maintained at the bottom of the interior of the pipeline to all points around the periphery and cascade such liquid directly in the line or path of flow of the gases. Furthermore, the gases are thereby caused to flow through a tortuous path and contact is established between the gases and the aqueous cleaning media. The result is that a virtually complete chemical reaction is obtained and the gases are completely scrubbed. The aqueous cleaning media, such as lime, flows from the cage area or active treatment space, e.g. by discharge over a pool depth regulating overflow weir at the outlet end of the feedline, and may then be either recycled or processed to reclaim any valuable chemical contents.

In accordance with the invention, the pipeline and the chains, as well as the cross-bars or liquid lifters, with or without the cage, are disposed on a substantially horizontal plane with a very low profile to expedite assemblage, maintenance and repair. The gases are moved through the horizontal self-cleaning area or active treatment space by either induced or forced draft and the aqueous cleansing media may be passed through the chain area concurrently or counter-currently to the direction of the flow of the gases, with suitable portions retained or dammed up in the line to provide the liquid pool.

DETAILED DESCRIPTION OF THE INVENTION

To facilitate an understanding of the invention as set forth in one embodiment thereof, reference is made to the following description and the illustrative drawings in which:

FIG. 4 is a sectional view of the pipeline showing another form of attachment of the tumbling media and the entrance and exit ports for the fluids.

FIG. 5 is a perspective view of a form of cross bar used in the present invention.

Figure 1:
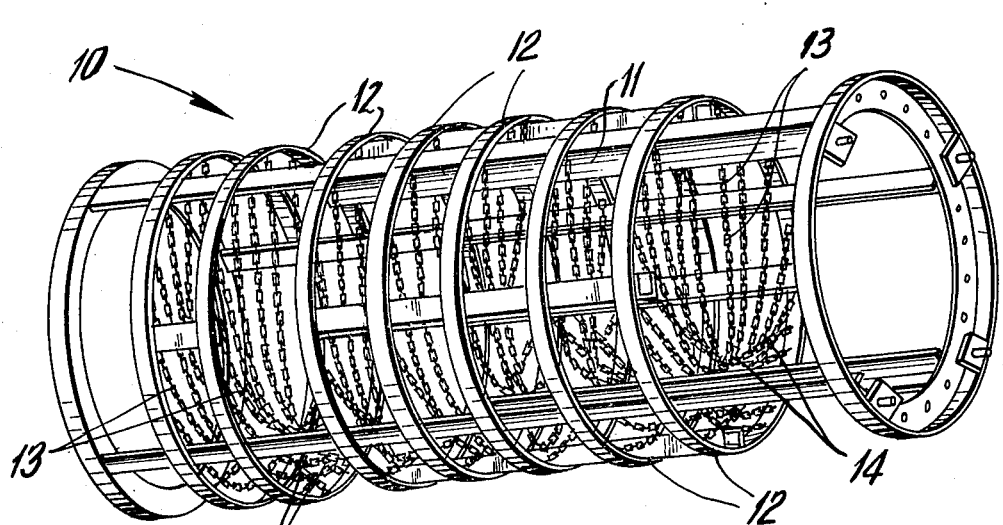
FIG. 1 is an isometric view of the self-cleaning cage structure having the tumbling media in suspended form.
Figure 3:
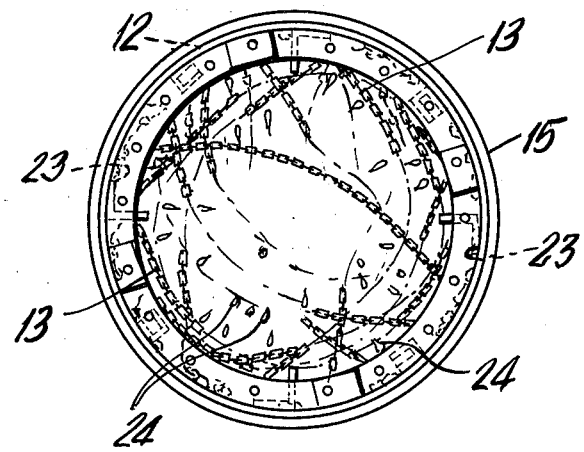
FIG. 3 is an end view of the cage within the pipeline with the tumbling media in an active position during rotation.

As shown in the drawings, a cage 10 comprises horizontally extending cross bars 11, preferably in the form of liquid lifters, secured intermediate and at their ends to hoops 12. While four cross bars and nine hoops are illustrated it will be understood that a greater or lesser number may be used, depending upon the conditions of operation. The tumbling media or flexible linear means or flexible linear dynamic thrust and impact means, e.g. in the form of chains 13, are attached to and suspend from the hoops, as illustrated in FIGS. 1 and 3. The chains are of a greater length than the distance between their fastening points and, consequently, provide loops or bowed or catenary extended portions 14. The entire cage structure is then inserted and attached by any suitable means to the interior of a substantially horizontal tubular feedline or pipeline 15. The pipeline 15 extends between the noxious gas-producing facility and the point where the gases are emitted into the atmosphere. The flexible linear means or chains, and the cross-bars or liquid lifters, may also, of course, be attached alternatively directly to the peripheral interior surface of the pipeline.

As shown in FIG. 4, the noxious gases 16 pass through the pipeline 15 from the entry port 17 via annular inlet end wall 18a to the exit port 18 via annular outlet end wall 18b. The gases are caused to flow by any well-known means (not shown) either in a forced or induced draft manner.

An aqueous cleaning solution 19, which is preferably a solution of lime, is introduced from the entrance 20 via annular inlet end wall 18a and passes through the line 15 to the exit 21 via annular outlet end wall 18b, after being maintained in the form of a pool 19a in the line for the desired purposes. The resultant relative flow of the aqueous solution is shown in FIG. 4 as being concurrent with the flow of the gases. However, of course, in terms of resultant relative flow or direction, the solution may flow counter-currently to the flow of the gases. In fact, the solution or liquid is replenished by introduction through entrance 20 at suitable intervals or continuously, and due to the end walls 18a and 18b is maintained in the form of a pool within the lower horizontal portion below the center axis 15a of the line, and is discharged via the annular opening of outlet end wall 18b which serves inherently as a pool depth regulating overflow weir communicating with exit 21.

While the fluids or gaseous and liquid reactants comprising gases 16 and an aqueous solution 19 pass through the line or flow path 15, the line 15 and the entire cage assembly 10 are rotated at any desirable speed by a motor 22.

As the line 15 rotates, the suspended chains are bounced and tumbled around the periphery of the interior wall 23 and dip into and are raised out of the liquid pool. As shown in FIG. 3 contact is made over substantially the entire inner wall of the pipeline. This action maintains the aqueous solution and particulate matter in a wet phase slurry form and completely inhibits any buildup of scale or caking. Furthermore, the tumbling action and contact with the interior wall 23 maintains the chains of the entire assemblage in a clean uncoated condition.

As shown in FIG. 3, as the chains tumble and bounce they splash and distribute the aqueous solution from the pool, dispersing it throughout the entire interior or active treatment space of the line 15. The splashing action causes droplets 24 to form, not only wetting the entire interior of the line, but making complete contact with the gases 16 passing through the line. Thus, a complete chemical reaction between the aqueous cleaning solution and the gases is effected whereby the gases are completely scrubbed prior to their emission at exit port 18.

As shown in FIG. 4, the chains may be suspended in another fashion, that is, from one hoop 12 to another in a catenary configuration. Similar results to those above described are obtained with this construction.

To accomplish the maintenance of the aqueous media in slurry form, the cross bars themselves may have the configuration shown in FIG. 5, that is, to form a liquid lifting means or scoop 25. This scoop or liquid lifter disperses and distributes the aqueous solution throughout the entire interior periphery of the line and causes the liquid to remain in wet phase to inhibit any caking or scaling. The liquid from the pool is captured within the axially extending scoop 25 and pumped or carried up to be dispersed during the travel of the cross bar 11. The mixing of the liquid is continuous and this cascading and redistributing action also carries the liquid into the path of the flowing gases and onto the chains both of which are then thoroughly wetted and cleansed.

In addition, the cross bars, if desired, may have flat bar portions 26 toward the end of the line 15 approaching the exit ports. This construction provides a highly beneficial demisting effect at this place in the pipeline 15, thereby overcoming still another major problem of heretofore-known scrubbers.

The low profile of the horizontal line 15 enables it to be easily assembled and the unit of the invention is the entire cleaning area between the point of entry of the noxious gses and their exit points. The substantially horizontal arrangement and low profile also provide for simple maintenance and replacement of parts.

The noxious gases such as sulfur oxides and/or nitrogen oxides which have been thoroughly cleaned will emit at exit point 18 virtually without any pollutants. Furthermore, the reacted aqueous alkaline or caustic solution which is preferably of a lime base may be recaptured such as in flowable slurry liquid form through the exit 21 and either recycled at suitable intervals or continuously, or any valuable minerals contained therein may be reclaimed by known means.

Thus, the present invention provides a highly efficient self-cleaning structure which, in addition to totally scrubbing the gases, also prevents caking or the buildup of scale deposits. Since such types of reactions are appropriately carried out at coparatively mild temperatures, often without substantially exceeding the boiling point of water, the rotating line, cage, chains, crossbars, and other elements may be made not only from steel or metal alloys but also from suitable plastic materials, fiberglas compositions, and other non-metallic materials.

Hence, the feedline 15 preferably includes internally therewithin for rotation therewith cross-bar means or stringer means 11 peripherally supported therewithin, optionally a plurality of hoops or hoop members 12 of a diameter approximating that of the feedline connected to the cross-bar means, and a plurality of tumbling media or flexible linear means or impact means, e.g. chain-like members or chains 13. According to one feature of the invention, one end of each such chain is anchored to the interior of one of the hoop members or to the pipeline interior itself and its opposite end is anchored to an interior point of a hoop member or to such pipeline interior removed from the first point of anchorage. The chain is of a length greater than that of the internal diameter of the hoop member and the space of the adjacent hoop member and/or of the pipeline itself, i.e. the chain is of a length greater than the distance between its fastening points. In this way, with rotation of the pipeline, the chains are adapted to be forced centrifugally outwardly, beyond the rims of the hoop members where such hoop members are present, toward and for contact with the interior walls of the pipeline, e.g. for a pre-selected angular distance, thereby to remove any formed precipitates and simultaneously mix the gaseous and liquid reactants, e.g. the noxious gases to be cleaned and the aqueous alkaline liquid, respectively, passing through the pipeline.

According to one aspect of the invention, therefore, an overall method is provided for treatment of a first fluid material, e.g. an aqueous alkaline liquid, in a rotating pipeline, which treatment generally results in the formation of particulate precipate material, e.g. the chemical reaction product of the noxious constituents in the gas with the reactive alkaline constituents in the aqueous liquid, tending to adhere to and coat the adjacent interior surfaces of the pipeline, and at the same time serves to purify the first fluid material or gas sufficiently to permit it to be vented to the atmosphere. The method comprises introducing and contacting such first and second fluid mterials or gaseous and liquid reactants in a substantially horizontally extending rotating pipeline or feedline defining a longitudinal or axial flow path constituting an active treatment space to form such particulate precipitate material, and discharging the resultant materials in flowable condition from the pipeline, while individually and repeatedly imparting actively throughout each cycle of pipeline rotation, at a composite plurality of localized individually spaced apart circumferential and axial points distributed along the pipeline and correspondingly in a direction substantially crosswise of the flow path, dynamic thrust and impact mechanically to the materials or reactants situated in and transversely throughout the active space (e.g. see FIG. 3) and to the adjacent surfaces within the flow path, sufficiently to achieve substantial dynamic intermixing contact and intimate treatment of the materials or reactants collectively throughout, across and along the active space (e.g. see FIGS. 1 to 4) during pipeline rotation and in turn break up of deposits, caking and scaling of the precipitate material as it forms on the adjacent surfaces within the flow path. In this way, the active space and adjacent surfaces within the flow path are maintained in substantially clean condition during pipeline rotation and the materials are maintained in substantially flowable condition for enhanced contact, intermingling and reaction until discharged from the active space of the pipeline.

By lifting axially or longitudinally extending portions of the liquid reactant materials and attendant particulate precipitate reaction product material from the pool situated in the active space, e.g. as a gas-liquid-solid or liquid-solid containing slurry mass, as the case may be, at circumferentially spaced apart intervals during pipeline rotation, the materials will be cascaded mixed and redistributed substantially throughout, across and along the active space. This is effected by providing in the pipeline the plurality of axially or longitudinally extending liquid lifting means, e.g. cross-bar means 11, circumferentially or arcuately spaced apart about and disposed peripherally at the pipeline interior surface.

Of course, the imparting of dynamic thrust and impact is inherently effected by providing in the pipeline the circumferentially distributed assemblage of individual flexible linear means or impact means, e.g. chains 13, capable of flexing and tumblimg, each correspondingly atached at two circumferentially spaced apart points of the pipeline interior surface crosswise of the active space (e.g. see FIGS. 1 to 4) to provide in correspondinng dynamic catenary suspension during pipeline rotation a normally bowed intermediate or central portion of predominant length between said two points extending crosswise substantially into the active space and collectively defining in corresponding dynamic suspension during pipeline rotation an aggregate of normally bowed intermedite portions operatively ranging across and occupying the flow cross-section of the active space. Such flexible linear impact means each has a predominant length in the bowed intermediate portion thereof, e.g. chain portion 14, which is insufficient for any slackened part thereof to substantially collect at the pipeline interior surface during pipeline rotation yet which is sufficient for achieving at substantially all times during such rotation flexing and tumbling of substantially all of said flexible linear means in the active space and operatively collectively ranging across and occupying of the active space by said flexible linear means and directly in the flow of materials passing along the pipeline (e.g. see FIG. 3).

It will be appreciated, therefore, that inherently the lifting means maintain dynamic cascading flow of the liquid reactant material across and along the active space and into contact with the flexible linear means such that the flow of the gaseous reactant material along the pipeline during rotation is always at some point in substantial dynamic contact with the liquid reactant material and any attendant precipitate reaction product material, and that inherently the flexible linear means or impact means collectively constantly flex and tumble under dynamic thrust and impact against the materials, pipeline interior wall surfaces and lifting means surfaces during pipeline rotation to break up any such deposits, caking and scaling of the precipitate material as it forms on the pipeline interior surface and on the lifting means surfaces and on the flexible linear means or impact means themselves and thereby maintain the same and the active space in substantially clean condition and the materials in more or less essentially flowable and constantly contacted and intermixed condition until discharged from the active space of the pipeline.

Figure 2:
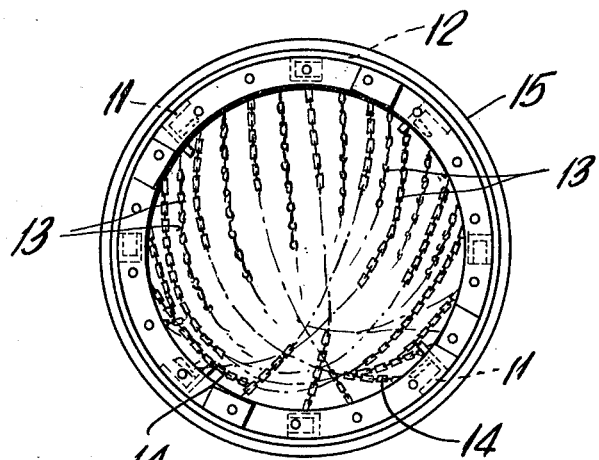
FIG. 2 is an end view of the cage structure attached within a rotating pipeline.

As shown in FIG. 2, the flexible linear means or impact means, in the form of chains 13, are individually attached at two circumferentially spaced apart points, e.g. diametrically remote from each other on the same hoop member 12. As contemplated in the embodiment of FIGS. 1 to 3, the hoop members with their chain curtains, preferably normal to the center axis of the feedline, and the interior surface of the pipeline together define a series of flow-connected compartments in the corresponding axial spaces betwen adjacent spaced apart hoop members.

Accordingly, it will be realized that the present invention in essence concerns a particular method of contacting gaseous reactant, for example noxious gas, with a pool of fluid treatment material or liquid reactant, such as an aqueous alkaline solution, in a particular rotating pipeline or feedline arrangement to purify the noxious gas to permit it to be vented into the atmosphere without polluting the same, with the removed pollutants or precursor constituents being represented by reaction products with the aqueous liquid in the form of particulate precipitate material which often tends to adhere to apparatus surfaces, such as the pipeline interior surface, during the purification process. In order to enhance and insure complete mixing and interaction between the noxious gas and aqueous solution, the method and feedline apparatus must be such that the noxious gas is maintained in constant contact with the aqueous liquid throughout the cross-section and extent of the flow path. This is accomplished by the provision in the feedline for the means for maintaining the liquid in the form of a pool, the assemblage of tumbling media or flexible linear means, and the liquid lifting or pumping means.

In connection with a particularly preferred feature of the present invention, the feedline or scrubber device in effect constitutes a rotating line or tube of substantially circular flow cross-section which contains chain curtains suspendedly affixed in a definite and more or less ordered pattern to or at the peripheral interior surface of the line or tube. The main purpose inherently of the chain curtain or curtains, as the case may be, is to provide increased surface area for contacting the liquid reactant with the gaseous reactant passing through the rotating line, inasmuch as there is insufficient surface area on the interior wall of the rotating line or tube as a practical matter to provide adequate surface area for such fluid contacting in terms of any practical tube or line dimension. It will be realized in particular that it is not the purpose of the chain curtain or curtains to move the reactant material in a forward direction through the line or tube, nor to provide or present increased surface area for drying purpose nor to achieve any attriting or sifting action relative to any solids present or incrementally formed during treatment in the line or tube.

According to this preferred feature, the chain curtains are desirably arranged in consecutive or successive sets, so that each set operatively collectively presents a crosswise plane substantially at right angles or normal to the flow of the gaseous reactant in the line or tube. This orientation maximizes gas impingement on the surface of the chains or other flexible linear means chosen. Furthermore, each chain or the like is affixed at each end thereof in effect in a circular or bowed or caternary pattern, such that the plane of the pattern is disposed substantially at right angles or normal to the axis of the line or tube, with the axis of the circular or bowed pattern being corespondingly parallel to the axis of the line or tube. The loosely suspended orientation of the chains or the like provides sufficient play or slack preferably of equal amount in each chain to allow each chain in each consecutive set or circle of chains along the axis of the line or tube to dip and collapse into a predetermined segment of area of the pool of liquid reactant maintained along the bottom of the rotating line or tube. It will be readily realized that in order to achieve a maximum dipping and collapsing effect, each consecutive chain should be affixed so that the chain is outside of the range of the preceding chain on the set or circle of chains.

Figure 6:
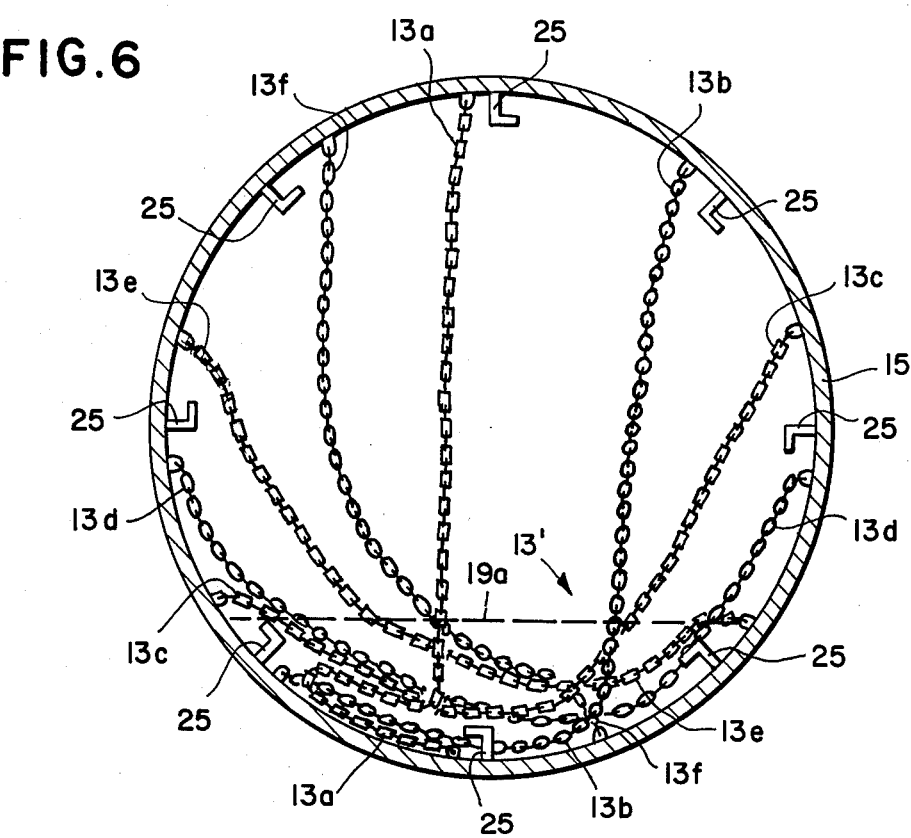
FIG. 6 is a schematic view of a further manner of arranging the tumbling media and cross-bars within the pipeline without the use of cage-forming hoops.

Thus, as shown in FIG. 6, the attachment of the ends of the individual chains or other flexible linear means or linear impact means to the interior surface of pipeline 15, by any suitable means such as bolts, etc., may be advantageously selected, such that for instance, in terms of the clockface crosswise flow area orientation shown, chain 13a is connected between the 12 and 6 positins, chain 13b is connected therebehind between the 1 and 7 positions, chain 13c is in turn connected therebehind between the 2 and 8 positions, and chain 13d is connected behind chain 13c between the 3 and 9 positions, with chains 13e and 13f being correspondingly connected therebehind between the 4 and 10 positions and 5 and 11 positions respectively. Whether this or a smaller or larger number of chains is so attached in regular or irregular staggered clockwise sequence at spaced apart circumferential points along the interior periphery of the feedline, and/or in the same crosswise plane or at relatively closely adjacent or operatively abutting, or relatively widely spaced apart, staggered successive axial points in correspondingly successive crosswise planes, so as to form such operational chain curtains collectively in assemblage, the mounting of the various chains is preferably carried out so as to provide each chain as a freely suspended cynamic unit, unobstructed by and unentangled and uninterlaced with the adjacent or vicinal chains circumferentially and/or axially disposed thereat. By avoiding the interbraiding, intertwining or otherwise interencumbering or entangling of the chains in such orientation, the common nodular criss-cross overlap center area 13' of the collective chains in dynamic but loosely associated assemblage is able to change constantly and freely for enhanced effect as the feedline and chains rotate, as the chains dip into the liquid pool 19a and strike the pipeline interior surface and as the liquid is lifted or pumped from such pool by the substantially axially extending and circumferentially spaced apart individual lifters 25 and cascaded onto the gaseous reactant and chains in the flow area above such pool.

It will be furthermore realized that it is not the objective of the present invention to introduce coarse solids into the chain and liquid lifter equipped feedline scrubbing device for treatment. While it is true that in some gas streams there will be airborne particulate matter and that in liquid scrubbing media there may be solid particulate matter such as in the case of a water slurry of lime, the instant feedline scrubber device and system are specifically designed for best handling a flowing liquid which ultimately moves from one end of the feedline or tube to the other as a result of the hydraulics of liquid flow. In this regard, the feedline srubber device and system are in no way designed to provide for moving such flowing liquid or any paticulate matter contained therein or formed as a reaction product during the feedline treatment simply by virtue of the chain arrangement.

As an inherent feature of the present invention, and in order to assure that the chain surfaces are maintained wet with the liquid reactant, e.g. as a liquid scrubbing medium, provision is made to constrict the liquid discharge end of the feedline or tube by means of, in effect, an annular dam or overflow weir. This overflow weir or centrally apertured annular dam or end wall backs up the liquid reactant toward the opposite end of the line or tube at which the liquid reactant is admitted, and is necessary in order that an appropriate segment on the bottom of the interior of the scrubber device or line be always filled with a pool of liquid reactant whereby to permit the chains to dip and collapse thereinto and become wetted. As the artisan will appreciate, a second annular dam or centrally apertured end wall may be provided at the liquid reactant entrance of the scrubber device or feedline in order to assure maintenance of this liquid pool along the bottom portion of the line, or, if the rotating tube or feedline or the liquid pool has sufficient operative relative pitch in the direction of the liquid flow, i.e. as compared to the true horizontal, this pitch may siffice to assure the maintenance of the liquid pool extending desirably from the vicinity of the liquid discharge end to the vicinity of the liquid admission end of the line. The latter feature is best illustrated in FIG. 7.

Figure 7:
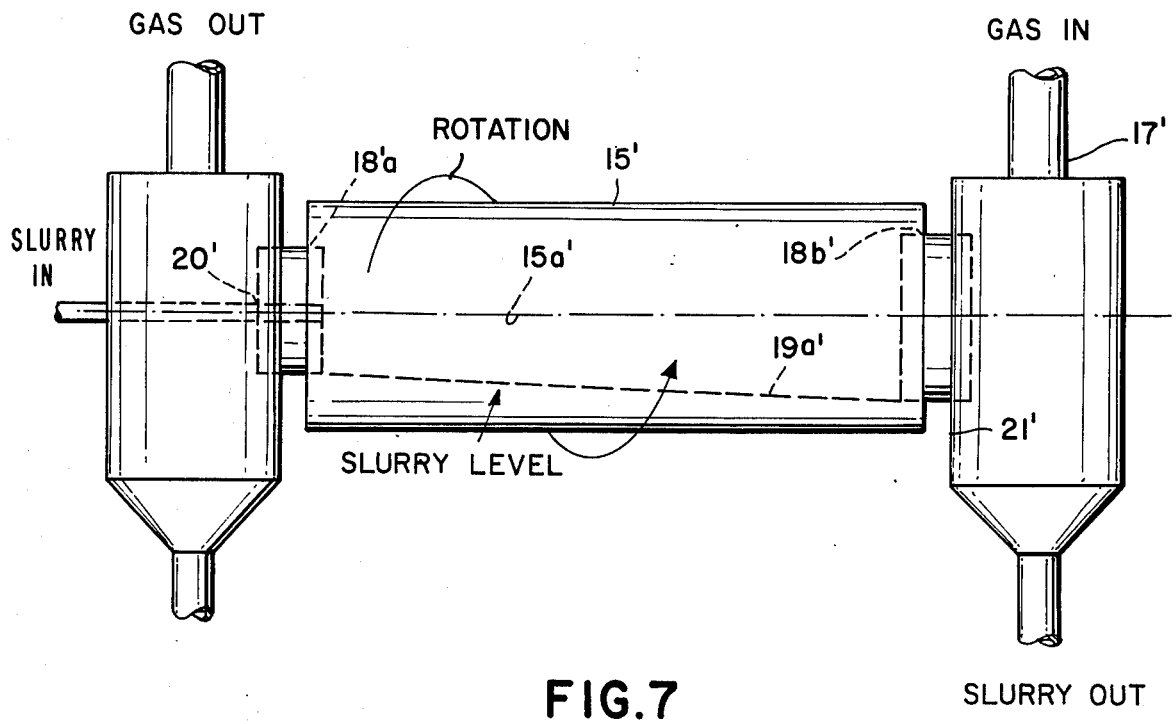
FIG. 7 is a schematic view on a reduced scale showing a modified slightly inclined orientation of the liquid pool within the pipeline.

Thus, in FIG. 7, instead of merely rotatably disposing the feedline at a slight incline with respect to the true horizontal and utilizing such annular dam or end wall as a dynamic discharge overflow weir, such means for rotatably disposing the pool at an operative relative incline with respect to the true horizontal are in the form of an annular liquid retaining means in the vicinity of each corresponding end portion of the feedline 15', including annular or apertured inlet end wall 18a' and annular or apertured outlet end wall 18b', with outlet end wall 18b' having a corresponding larger internal open flow diameter than inlet end wall 18a'. Outlet end wall 18b' is operatively situated in open flow communication with the exit 21' for the liquid reactant, e.g. aqueous lime slurry or reaction product containing liquid flowable sludge, at the corresponding end portion of the rotatable feedline and inherently defines a pool depth regulating overflow weir or dam threat for positive directional flow imparting discharge of such liquid reactant thereover and out through exit 21'. Due to the differential internal diameters of annular end walls 18a' and 18b', the liquid pool 19a' extends at an operative incline with respect to the true horizontal and is automatically controlled thereby as to its normal pitch, level and depth, i.e. within the lower horizontal portion below the center axis 15a' of the line.

In the orientation shown in FIG. 7, a counter current flow relation of gaseous reactant and liquid reactant is provided, in which the liquid reactant enters via entrance 20' appropriately at the left end portion of feedline 15' through annular end wall 18a' and is discharged at the right end portion of feedline 15' over annular end wall 18b', e.g. for gravity flow removal via the lower end of exit 21' and optional recycling selectively of part or all thereof for suitable replenishing of the liquid pool with any fresh make-up quantities of liquid reactant as may be necessary, and also in which the gaseous reactant fed via entry port 17' at the upper end of exit 21' enters appropriately at the right end portion of the feedline through annular end wall 18b' and is discharged at the left end portion of the feedline through annular end wall 18a' for venting to the atmosphere, such gaseous reactant being suitably conveyed by induced or forced draft or other conventional fluid conveying means through the system. On the other hand, a concurrent flow relation of gaseous reactant and liquid reactant may alternatively be provided, e.g. in corresponding operative orientation to that contemplated in FIG. 4. In either instance, the feedline will also inherently contain the instant tumbling media or flexible linear or impact means (not shown) and such liquid lifting means (not shown) as well.

It should be noted that the instant orientation and arrangement provides a combination in sharp contrast to those arrangements of tubular kilns or dryers containing chains and which have as an objective the movement of solids present or incrementally formed during treatment toward the discharge end of the unit and which in turn do not provide a dam or weir of the kind permitting controlled retention of a liquid segment or pool on the bottom of the rotating line or tube.

In order to assure further that the chains in the assemblage according to the invention are continuously wetted as well as to provide an increase in the liquid surface area available for treatment or reaction with the gas passing through the scrubber feedline, the instant liquid lifting means are advantageously also provided. It will be realized that such lifting means are attached to or at the interior wall of the rotating line or tube, parallel to the center axis of the line, and are so designed that axial portions of the liquid reactant in the pool on the bottom of the line will be efficiently raised or pumped by the lifting means as an inherent result of the line or tube rotation, whereby the lifted liquid portions will be cascaded over the chains as the lifting means discharge the liquid reactant incrementally upon approaching the zenith of rotation on the top of the line or tube. Such discharge of liquid reactant not only further wets the chain surfaces but also provides in essence a huge surface area of splashing liquid reactant droplets which further enhance the liquid-gas phase contact. The objective of such lifting means is clearly not to take up or entrain any solids which might be present. In this regard, while finely divided precipitated or airborne solids may well be present normally in the scrubber device or feedline system according to the present invention, such materials exist as a liquid flowable mass with the liquid reactant provided, and not merely as essential solids. Otherwise, the lifting means in the intended form would soon become plugged and ineffective in the presence of such solid matter alone.

Consequently, the combination of chains or other flexible linear means and the liquid lifting means together with the means for maintaining a pool of liquid reactant on the bottom of the feedline provides in essence a system constituting in combination a conjoint packed tower and spray column in horizontally extending orientation for the enhanced treatment of gases with liquids, especially useful for environmental pollution control gas scrubbing purposes.

Based on preliminary experimental data, it has been determined for instance, that for efficient removal of sulfur dioxide and other sulfur gases using the instant system, the gases should remain in contact with the chains for a minimum of three seconds as the gases pass through the feedline. Such data indicates that a one second contact removes in the range of 40% sulfur gases from the inlet gaseous reactant stream, and that a two second contact removes in the range of 70% of such sulfur gases, whereas a three second or longer contact removes in the range of 85 to 100% sulfur gases from such stream. Likewise, it has been established that approximately one square foot of chain surface per square foot of operative feedline area per chain set or curtain provides an optimum chain surface area for liquid-gas phase contact. Although these parameters appear at present to be indicative of certain advantageous features of the inherent system of the present invention, it is not intended that the present invention be in any way limited thereby.

Furthermore, and subject to the same non-limiting proviso, it has been established preliminarily that the rotational speed of the feedline or tube appears to be optimum when in the range of 144 peripheral feet per minute at practical industrial scale pipeline diameters. Nevertheless, in connection with the instant lifting means, it appears that for any given rotational speed, there is provided a liquid volume taken up or pumped by the lifting means which is equivalent to about 20% of the gas volume in the feedline scrubber device at any given time. Thus, the greater the peripheral speed or rotational speed, the greater the quantity of liquid that will be cascaded per revolution, and accordingly, the gas to liquid ratio will increase or decrease for any given liquid lifting means design based upon the particular rotational speed. Also, such gas-liquid ratio can be varied by varying the volume of gas passing through the scrubber feedline at any given time. Significantly, this is not possible in a rotating line or tube containing chains in which the purpose is to dry liquid material or move solid material in a forward direction through the unit. It appears that only the hydraulics of liquid flow and gas flow respond at a practical rate to the control of the gas-liquid ratio by virtue of the gas flow, liquid lifting means design as contemplated herein, depth of liquid pool and rotational speed of the line or tube.

The pertinent gas-liquid ratio in this regard may be defined as the product of the effective cross-sectional area of the feedline (ft$^2$) and the gas velocity (ft/min.), i.e. the total gas flow (ft$^3$/min.), divided by the product of the volume of the liquid raised by the lifting means (ft$^3$) and the rotational speed (rmp), i.e. the total liquid raised or pumped (vol./min).

Thus, significant parameters of the system of the present invention include the provision for a selectively controlled depth liquid pool, a selectively controlled rotational speed, and suitable gas-liquid ratios, significantly at autogenous temperatures corresponding to or not essentially exceeding the boiling temperature of water, all without applying extraneous heat to the system, i.e. under ambient temperature and pressure conditions, perhaps modified by the induced or forced draft flow conditions for moving the gaseous reactant through the feedline. The essential presence of a pool of liquid within the feedline is self-evident since if the feedline were to become dry inside, it would cease to be a packed column and spray tower type gas scrubber because the reaction between the noxious gases such as sulfur oxides and the liquid scrubbing media such as aqueous lime solution would cease.

Broadly, therefore, the present invention contemplates as a basic feature a method combination for carrying out a reaction between gaseous and liquid reactants, which comprises conducting a gaseous reactant through a rotating substantially horizontally extending confined feedline containing a gaseous reactant flow path and having a center axis, maintaining liquid reactant in the feedline in the form of a pool within the lower horizontal portion below the center axis of the feedline in any position of rotation of such feedline, and reacting such reactants in the presence of loosely disposed individual tumbling media or means distributed along the interior of the feedline, or an assemblage of loosely disposed individual flexible linear means, e.g. chains, suspendedly attached at circumferentially spaced apart points in the vicinity of the respective ends of each such flexible linear means adjacent the peripheral interior portion of the feedline and collectively forming a dynamic curtain of such flexible linear means operatively extending substantially into the path of the gaseous reactant above such pool, as the case may be, for effecting the dynamic contacting and intermingling of the gaseous reactant with portions of the liquid reactant thereby taken up from the pool and wetting the surface of the tumbling media or flexible linear means thereat during rotation of the feedline, whereby to enhance the reaction between such reactants.

Preferably, substantially axially extending portions of the liquid reactant are concomitantly lifted from the pool at circumferentially spaced apart intervals during rotation of the feedline to cascade the lifted portions of the liquid reactant onto the gaseous reactant and the tumbling media or flexible linear means and mix such reactants substantially throughout, across and along such flow path.

In particular, the assemblage of flexible linear means includes a plurality of axially spaced apart successive sets of flexible linear means, each set extending substantially crosswise of, and preferably normal to, the axis of the feedline and including a plurality of individual loosely disposed flexible linear means suspendedly attached at circumferentially spaced apart points in the vicinity of the respective ends of each such flexible linear means adjacent the peripheral interior portion of the feedline and collectively forming a dynamic curtain of such flexible linear means operatively extending substantially crosswise of, and correspondingly preferably normal to, the axis of the feedline and into the path of the gaseous reactant above such pool.

Ultimately, portions of liquid reactant containing reaction product from the reaction between the gaseous and liquid reactants are recovered from the pool and-make up quantities of liquid reactant are provided to replenish such pool as necessary. In particular, the pool desirably extends substantially from one end of the feedline to the other end thereof and make up quantities of liquid reactant are introduced thereto at such one end while portions of liquid reactant containing reaction product are recovered therefrom at such other end by discharge over a pool depth regulating overflow weir thereat.

Thus, the gaseous reactant may be an acid reacting noxious oxide containing gas and the liquid may be an aqueous alkaline containing solution, and the reaction may be carried out under ambient temperature and pressure conditions.

In the same way, broadly, the present invention contemplates as a concomitant basic feature an apparatus combination for carrying out reactions between gaseous and liquid reactants, which comprises a rotatably disposed and substantially horizontally extending confined feedline containing a gaseous reactant flow path and having a center axis and inlet and outlet means for the gaseous and liquid reactants, means in the feedline for maintaining liquid reactant in the form of a pool within the lower horizontal portion below the center axis of the feedline in any position of rotation of such feedline, and a plurality of loosely disposed individual tumbling media or means distributed along the interior of the feedline, or an assemblage of loosely disposed individual flexible linear means suspendedly attached at circumferentially spaced apart points in the vicinity of the respective ends of each such flexible linear means adjacent the peripheral interior portion of the feedline and collectively forming a dynamic curtain of such flexible linear means operatively extending substantially into the path of the gaseous reactant above such pool, as the case may be, for effecting the dynamic contacting and intermingling of the gaseous reactant with portions of the liquid reactant thereby taken up from the pool and wetting the surface of the tumbling media or flexible linear means thereat during rotation of the feedline, whereby to enhance the reaction between such reactants.

Preferably, a plurality of substantially axially extending liquid lifting means are attached at circumferentially spaced apart points adjacent the peripheral interior portion of the feedline for lifting axially extending portions of the liquid reactant from the pool during rotation of the feedline to cascade the lifted portions of the liquid reactant onto the gaseous reactant and the tumbling media or flexible linear means mix such reactants substantially throughout, across and along such flow path.

The feedline is desirably in the form of an axially elongated tubular member of substantially circular flow cross-section having a length greater than its diameter, the liquid lifting means are generally in the form of cross-bar elements, and the tumbling media or flexible linear means or flexible linear impact means are preferably in the form of chain members or chains.

In turn, the means for maintaining liquid reactant in the form of a pool include annular liquid retaining means, preferably with the inclusion of one such retaining means in the vicinity of each corresponding end portion of the feedline, or in the event the feedline is rotatably disposed at an inclined angle with respect to the true horizontal, then with the inclusion of at least one such retaining means, i.e. in the vicinity of the corresponding lowermost inclined end portion of the feedline, thereby to provide means for rotatably disposing the pool at an operative relative incline with respect to the true horizontal.

In accordance with one particularly advantageous alternative aspect of the invention, the means for rotatably disposing the pool at an operative relative incline with respect to the true horizontal include an annular liquid retaining means in the vicinity of each corresponding end portion of the feedline, one of the annular liquid retaining means having a correspondingly larger internal open flow diameter than the other annular liquid retaining means and being situated in flow communication with the outlet means for the liquid reactant at one corresponding end portion of the feedline and defining a pool depth regulating overflow weir for positive directional flow imparting discharge of liquid reactant thereover and out through said outlet means.

In particular, as regards the hoop member or cage orientation feature, the means for mounting the flexible linear means and the liquid lifting means may include a plurality of axially spaced apart individual hoop members, for example corresponding to the plurality of successive set of flexible linear means, as noted above, and operatively disposed within the feedline and extending preferably substantially normal to the axis of the feedline with their corresponding peripheries adjacent the feedline peripheral interior portion surface for rotation with the feedline. In turn, the lifting means are desirably in the form of cross-bar elements or scopps disposed axially along the hoop members in circumferentially spaced apart relation and attached thereto for rotation therewith to effect such lifting. In this regard, the flexible linear means are desirably in the form of chain members or chains correspondingly suspendedly attached at two circumferentially spaced apart points to the hoop members crosswise of the flow path for rotation therewith to effect such dynamic contacting and intermingling.

While the invention has been described in detail with reference to substantially one overall embodiment thereof, it is to be understood that the concept encompasses tumbling self-cleaning media or flexible linear or impact means, liquid pool maintaining means and liquid lifting means of any desired shape or form which are operatively provided within the interior of the line or active flow space to effect the aforesaid results. The term "substantially horizontal", as used herein, is intended to encompass various angular dispositions of the line and/or so-maintained liquid pool between the entrance and exit ports. Furthermore, the details of the structure, method parameters and total conjoint packed tower and spray column type systems are in no way intended to limit the scope of the invention as defined in the appended claims.

The following example is set forth by way of illustration and not limitation of the present invention:

EXAMPLE

To remove noxious sulfur oxide gases from the stack discharge of a coal-fired boiler producing approximately 56,000 ft$^3$/min. of stack gases averaging about 2700 parts per million (ppm) sulfur dioxide, such stack gases are fed to the gas inlet end-slurry liquid discharge outlet end of a countercurrent gas-liquid relative directional flow orientation conjoint packed tower and spray column type system according to the invention in the form of a substantially horizontally extending and rotatably disposed tubular feedline of circular flow cross-sectional shape.

The feedline has a tube or shell internal diameter of 11 ft., an overall length of 40 ft., an annular dam at the gas outlet end-slurry liquid inlet end thereof and an annular slurry overflow discharge weir at the gas inlet end-slurry liquid discharge outlet end thereof, and a chain section composed of an array of 31 sets of chain curtains. Each individual set or curtain contains 16 evenly circumferentially spaced apart chains loosely extending radially between diametrically opposed corresponding attachment points on the feedline interior in the unentangled catenary suspension manner shown in FIG. 2, and each individual curtain collectively extends substantially normal to the axial flow path and is more or less evenly axially spaced from the next successive chain curtain in tandem, such that the chain section extends for an overall intermediate length of 36 ft. within the feedline, leaving a freeboard of 2 ft. at each end of the feedline, to assure that the chains contact neither the feedpipe for the scrubbing reagent or slurry liquid at the gas outlet end-slurry liquid inlet end nor the annular slurry overflow discharge weir at the gas inlet end-slurry liquid discharge outlet end thereof during feedline rotation.

The feedline is driven by a mechanism to provide a rotational speed of 144 lineal or peripheral ft/min, and is provided interiorly with a plurality of circumferentially evenly spaced apart and axially extending lifting devices in the manner shown in FIGS. 1 and 2 for cascading the reagent slurry from the liquid pool extending along the lower portion of the feedline between such annular liquid inlet dam and annular liquid discharge weir for the desired purposes. The weir at the liquid discharge end of the feedline is 12 inches in height to assure the maintaining of an adequate depth liquid pool at all times, i.e. the difference between the outer diameter and the internal diameter of the annular end wall defining the discharge weir being 2 feet (11 ft. less 9 ft.), with the annular end wall at the outer end of the feedline concomitantly dimensioned to achieve positive resultant liquid flow toward the discharge weir.

In operating this installation, a water slurry of slaked high calcium quicklime is used as the gs scrubbing agent, the quantity of lime introduced into the feedline scrubber being adjustably related to the quantity of sulfur dioxide gas in the incoming boiler gases, by means of conventional measurement instruments, so as to maintain the pH of the liquid reaction product flowing over the discharge weir at approximately pH 6.8. Volume adjustment of the incoming hot gases as a result of their cooling in the feedline scrubber is correspondingly offset more or less by the concomitant formation of water vapor generated from the attendant aqueous slurry liquid pool under the ambient and autogenous conditions present, not essentially exceeding the boiling temperature of water. The effective flow cross sectional area of the feedline is reduced by about 20% due to the space occupied by the chains and lifting devices, and at such incoming stack gas flow of 56,000 ft$^3$/min. the system provides a residual gas flow velocity at the discharge end of the feedline of 12 ft/sec. which corresponds to a retention time of at least 3 seconds for the gases flowing through the 36 ft. long chain section portion and which is sufficient for achieving efficient gas-liquid intimate contact and sulfur oxide removal by the cleansing liquid slurry while the chains act under dynamic thrust and impact collectively against the reactant materials, feedline interior wall surfaces and lifting device surfaces during feedline rotation.

Over a duration of approximately 6 weeks, this pollution control conjoint packed tower and spray column constituted feedline scrubber is operated intermittently for periods ranging from several hours to several days, without troublesome scale formation, using an incoming stack gas having a sulfur oxide content varying from 2200 to 2800 ppm and providing an environmentally acceptable essentially completely scrubbed exit gas having a sulfur oxide content varying from 16 to 100 ppm. As the artisan will appreciate, longer retention times, larger unit installations, higher rotational speeds, reduced gas flow volumes and flow velocities, offsetting liquid pool adjustments and the like will insure adequate removal of noxious constituents from the incoming gas consonant with the foregoing.

What is claimed is:

1. Method for carrying out a reaction between gaseous and liquid reactants which comprises conducting a gaseous reactant through a rotating substantially horizontally extending confined feedline containing a gaseous reactant flow path and having a center axis, maintaining liquid reactant in the feedline in the form of a pool within the lower horizontal portion below the center axis of the feedline in any position of rotation of such feedline, reacting such reactants in the presence of an assemblage of flexible linear means including a plurality of axially spaced apart successive sets of flexible linear means, each set extending substantially normal to the axis of the feedline and including a plurality of loosely disposed individual flexible linear means suspendedly attached at circumferentially spaced apart points in the vicinity of the respective ends of each such flexible linear means adjacent the peripheral interior portion of the feedline for rotation therewith and collectively forming a dynamic curtain of such flexible linear means operatively extending substantially normal to the axis of the feedline and into the path of the gaseous reactant above such pool for effecting the dynamic contacting and intermingling of the gaseous reactant with portions of the liquid reactant thereby taken up from the pool and wetting the surface of the flexible linear means thereat during rotation of the feedline, whereby to enhance the reaction between such reactants, and recovering from the pool portions of liquid reactant containing reaction product from the reaction between the gaseous and liquid reactants.

2. Method for carrying out a reaction between gaseous and liquid reactants which comprises conducting a gaseous reactant through a rotating substantially horizontally extending confined feedline containing a gaseous reactant flow path and having a center axis, maintaining liquid reactant in the feedline in the form of a pool within the lower horizontal portion below the center axis of the feedline in any position of rotation of such feedline, reacting such reactants in the presence of an assemblage of flexible linear means including a plurality of axially spaced apart successive sets of flexible linear means, each set extending substantially normal to the axis of the feedline and including a plurality of individual loosely disposed flexible linear means suspendedly attached at circumferentially spaced apart points in the vicinity of the respective ends of each such flexible linear means adjacent the peripheral interior portion of the feedline for rotation therewith and collectively forming a dynamic curtain of such flexible linear means operatively extending substantially normal to the axis of the feedline and into the path of the gaseous reactant above such pool for effecting the dynamic contacting and intermingling of the gaseous reactant with portions of the liquid reactant thereby taken up from the pool and wetting the surface of the flexible linear means thereat during rotation of the feedline, and while concomitantly lifting axially extending portions of the liquid reactant from the pool at circumferentially spaced apart intervals during rotation of the feedline to cascade the lifted portions of the liquid reactant onto the gaseous reactant and the flexible linear means and mix such reactants substantially throughout, across and along such flow path, whereby to enhance the reaction between such reactants, and recovering from the pool portions of liquid reactant containing reaction product from the reaction between the gaseous and liquid reactants and replenishing such pool with make-up quantities of liquid reactant.

3. Method according to claim 2 wherein the pool extends substantially from one end of the feedline to the other end thereof, and make-up quantities of liquid reactant are introduced thereinto at such one end and portions of liquid reactant containing reaction product are recovered therefrom at such other end by discharge over a pool depth regulating overflow weir thereat.

4. Method according to claim 3 wherein the gaseous reactant is a sulfur dioxide containing gas and the liquid reactant is a lime containing aqueous solution, and the reaction product includes particulate precipitate material forming a slurry with the lime containing solution.

5. Apparatus for carrying out reactions between gaseous and liquid reactants which comprises a rotatably disposed and substantially horizontally extending confined feedline containing a gaseous reactant flow path and having a center axis and inlet and outlet means for the gaseous and liquid reactants, wall means in the feedline for maintaining liquid reactant in the form of a pool within the lower horizontal portion below the center axis of the feedline in any position of rotation of such feedline, an assemblage of flexible linear means including a plurality of axially spaced apart successive sets of flexible linear means, each set extending substantially normal to the axis of the feedline and including a plurality of loosely disposed individually flexible linear means suspendedly attached at circumferentially spaced apart points in the vicinity of the respective ends of each such flexible linear means adjacent the peripheral interior portion of the feedline for rotation therewith and collectively forming a dynamic curtain of such flexible linear means operatively extending substantially normal to the axis of the feedline and into the path of the gaseous reactant above such pool for effecting the dynamic contacting and intermingling of the gaseous reactant with portions of the liquid reactant thereby taken up from the pool and wetting the surface of the flexible linear means thereat during rotation of the feedline, and a plurality of axially extending liquid lifting means attached at circumferentially spaced apart points adjacent the peripheral interior portion of the feedline for rotation therewith and for concomitantly lifting axially extending portions of the liquid reactant from the pool during rotation of the feedline to cascade the lifted portions of the liquid reactant onto the gaseous reactant and the flexible linear means and mix such reactants substantially throughout, across and along such flow path, whereby to enhance the reaction between such reactants.

6. Apparatus for carrying out reactions between gaseous and liquid reactants which comprises a rotatably disposed and substantially horizontally extending confined feedline containing a gaseous reactant flow path and having a center axis and inlet and outlet means for the gaseous and liquid reactants, means including annular liquid retaining means in the feedline for maintaining liquid reactant in the form of a pool within the lower horizontal portion below the center axis of the feedline in any position of rotation of such feedline, an assemblage of flexible linear means including a plurality of axially spaced apart successive sets of flexible linear means, each set extending substantially normal to the axis of the feedline and including a plurality of individual loosely disposed flexible linear means suspendedly attached at circumferentially spaced apart points in the vicinity of the respective ends of each such flexible linear means adjacent the peripheral interior portion of the feedline for rotation therewith and collectively forming a dynamic curtain of such flexible linear means operatively extending substantially normal to the axis of the feedline and into the path of the gaseous reactant above such pool for effecting the dynamic contacting and intermingling of the gaseous reactant with portions of the liquid reactant thereby taken up from the pool and wetting the surface of the flexible linear means thereat during rotation of the feedline, and a plurality of axially extending liquid lifting means attached at circumferentially spaced apart points adjacent the peripheral interior portion of the feedline for rotation therewith and for concomitantly lifting axially extending portions of the liquid reactant from the pool during rotation of the feedline to cascade the lifted portions of the liquid reactant onto the gaseous reactant and the flexible linear means and mix such reactants substantially throughout, across and along such flow path, whereby to enhance the reaction between such reactants, 7. Apparatus according to claim 6 wherein the flexible linear means are in the form of chain members, the feedline is in the form of an axially elongated tubular member of substantially circular flow cross-section having a length greater than its diameter, and the liquid lifting means are in the form of cross-bar elements, and wherein means for mounting the flexible linear means and the liquid lifting means are provided including a plurality of axially spaced apart individual hoop members corresponding to the plurality of sets of flexible linear means and operatively disposed within the feedline and extending substantially normal to the axis of the feedline with their corresponding peripheries adjacent the feedline peripheral interior portion surface for rotation with the feedline, the lifting means in the form of said cross-bar elements being disposed axially along the hoop members in circumferentially spaced apart relation and attached thereto for rotation therewith to effect such lifting, and the flexible linear means in the form of said chain members being correspondingly suspendedly attached at two circumferentially spaced apart points to the hoop members crosswise of the flow path for rotation therewith to effect such dynamic contacting and intermingling.

8. Apparatus according to claim 6 wherein the means for maintaining liquid reactant in the form of a pool include an annular liquid retaining means in the vicinity of each corresponding end portion of the feedline.

9. Apparatus according to claim 6 wherein the feedline is rotatably disposed at an operative relative incline with respect to the true horizontal, and the means for maintaining liquid reactant in the form of a pool include an annular liquid retaining means in the vicinity of the corresponding lower-most operative relative inclined end portion of the feedline.

10. Apparatus for carrying out reactions between gaseous and liquid reactants which comprises a rotatably disposed and substantially horizontally extending confined feedline containing a gaseous reactant flow path and having a center axis and inlet and outlet means for the gaseous and liquid reactants, means including annular liquid retaining means in the feedline for maintaining liquid reactant in the form of a pool within the lower horizontal portion below the center axis of the feedline in any position of rotation of such feedline, and an assemblage of loosely disposed individual flexible linear means suspendedly attached at circumferentially spaced apart points in the vicinity of the respective ends of each such flexible linear means adjacent the peripheral interior portion of the feedline and collectively forming a dynamic curtain of such flexible linear means operatively extending substantially into the path of the gaseous reactant above such pool for effecting the dynamic contacting and intermingling of the gaseous reactant with portions of the liquid reactant thereby taken up from the pool and wetting the surface of the flexible linear means thereat during rotation of the feedline, whereby to enhance the reaction between such reactants.

* * * * *